Sept. 26, 1967 A. L. FREEDLANDER ETAL 3,343,355
LAWN MOWER BLADE
Filed Dec. 7, 1966
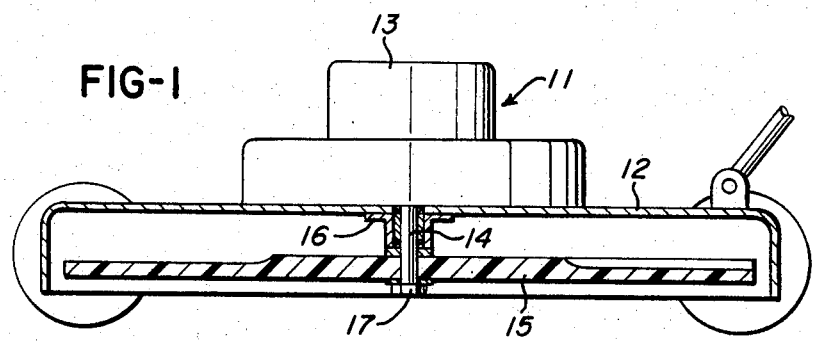
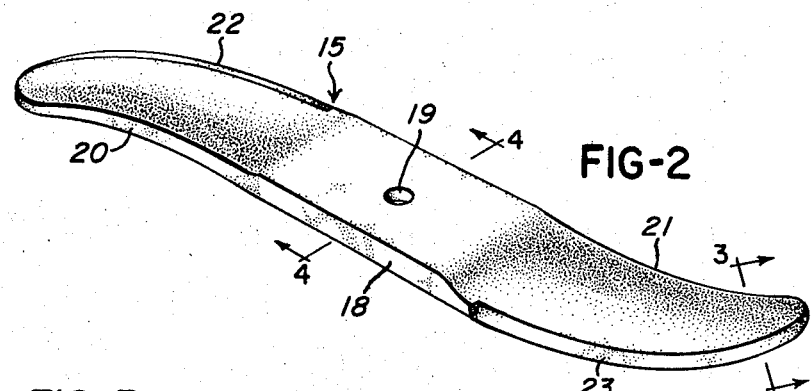
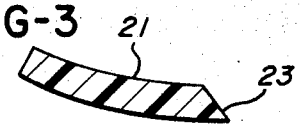
INVENTORS
ABRAHAM L. FREEDLANDER
ROBERT E. MATTHEWS
WAYNE C. GARRETT
BY
Reuben Wolk
ATTORNEY

United States Patent Office 3,343,355
Patented Sept. 26, 1967

3,343,355
LAWN MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Dec. 7, 1966, Ser. No. 599,900
4 Claims. (Cl. 56—295)

ABSTRACT OF THE DISCLOSURE

A lawn mower blade made of a flexible elastomeric material without internal reinforcement, in which the cutting arms are curved in a plane which is at right angles to the plane of cutting, while at the same time the cutting portions are curved upwardly from the cutting surfaces to form a smooth continuous surface.

---

The present invention refers to a lawn motor blade which is mounted on a power driven rotary lawn mower of the type used by the average homeowner and in industrial operations. The term "rotary" refers to a mower which is gasoline or electric powered in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and mulching leaves. Unfortunately, the extremely high speeds of operation, ranging up to 3600 r.p.m., create extremely high hazards for the operator. It is not uncommon for the operator's foot to slip under the housing and be struck by the rotating blade, causing serious injury. Further, the conventional metal lawn mower blade may strike large rocks, posts, or other objects causing the blade to break and hurl pieces of metal at the operator or other persons close by, and damaging the machine. Additionally, loose stones and similar items are often struck by rigid metal blades and thrown great distances to create additional injury or damage.

According to the present invention the above disadvantages are overcome by the use of a new type of blade shaped somewhat similar to a metal blade, but made of an elastomeric material that is sufficiently rigid to cut the grass, and yet is sufficiently flexible to permit the blade to flex when striking objects such as a shoe, a large rock, or a post. The flexing action permits the blade to ride over the object and avoid the problems referred to above. The blade also has sufficient inherent elasticity to cushion the initial shock and prevent it from breaking when it hits immovable objects. This blade also has a favorable action when striking small stones and similar objects since the initial impact is somewhat cushioned and the speed at which these objects are hurled is considerably reduced. The blade further has the property of being able to flex repeatedly without destroying any of these properties, and also retains the cutting edge for a remarkably long time. During operation, the material elongates only a small amount and yet has sufficient elastic memory to return to its original size. The blade does not become soft during operation as might be expected of elastomeric material, but retains its initial properties which are an excellent compromise between sufficient rigidity for cutting and sufficient flexibility for safety. Further, the blade is simple to manufacture and comparatively inexpensive. In United States patent application Ser. No. 589,106, filed Oct. 24, 1966, of common assignment, a similar blade is described as being formed of nonreinforced homogenous flexible elastomeric material, having a cutting portion curved upward from the cutting edge toward the trailing edge to create a high degree of air turbulence and throw the grass outward under high speed. In addition, the curved surface of that blade permitted the entire blade to ride over an obstruction such as a shoe or rock and minimize the possibility of injury or damage.

The present invention provides an improvement over the prior invention in that the same curved shape is retained, but at the same time the cutting arms of the blade are also curved in a plane at right angles to the shaft, somewhat in the shape of a scimitar. It has been found that this shape enhances the cutting action of the blade by permitting the cutting surface to strike the blades of grass at an angle, thus providing a slicing action. The perferred material of this blade is similar to that described in the previous invention; namely, a urethane elastomer of the cast type.

Referring now to the drawings:
FIGURE 1 is a side elevational view of a typical lawn mower in partial section.
FIGURE 2 is a perspective view of a novel blade manufactured in accordance with the invention.
FIGURE 3 is a cross section of the blade taken along lines 3—3 of FIGURE 2.
FIGURE 4 is a cross section of the blade taken along lines 4—4 of FIGURE 2.

Referring to the drawings, FIGURE 1 illustrates a conventional lawn mower 11 having a housing 12 upon which is mounted a motor 13 and a shaft 14 extending downwardly through the housing. Mounted on the shaft is the blade 15 which is secured to the shaft by means of bushing 16 and nut 17. The blade 15 is shown in FIGURE 2 as being formed of a single layer of elastomeric material having a central mounting portion 18 which is rectangular in cross section as illustrated in FIGURE 4, and having an aperture 19 in the center thereof for mounting purposes. The central portion 18 has a maximum width extending for about half the length of the blade. The blade then terminates in two arms 20 and 21 which are curved oppositely from each other in a plane at right angles to the shaft, terminating in rounded tips. The leading edge of each of these arms is the cutting edge and designated by reference numerals 22 and 23, and is shaped somewhat like the cutting of a scimitar. From the leading or cutting edge the blade curves smoothly upward toward the trailing edge, as shown in FIGURE 3, and thus forms a smooth continuous arc with respect to the central plane of the blade as represented by the central mounting portion 18. While the cutting surface is beveled upwardly so that the sharpened edge is at the lowermost portion of the arm, it is also possible to provide a chisel point so that the cutting edge is centrally located with respect to the cutting arms, or it is possible to bevel the sharpened edge in a direction oppositely from that shown.

In prior art devices, such as United States Patent No. 3,133,398, it has been found necessary to utilize reinforcing means to provide structural integrity to an elastomeric blade. In the present invention, however, the blade is capable of maintaining this integrity without reinforcement by utilizing certain types of elastomeric material. A preferred material is a urethane elastomer of the type which is adapted to be cast and which is formulated from a polyester based isocyanate terminated prepolymer. This material is formed through a chain extension with selected polyols or other polyfunctional active hydrogen materials and has been found to provide the necessary physical and mechanical characteristics. The material may be used in a wide range from 90 Shore A to 70 Shore D and has the following characteristics:

Hardness, 90–95 A; 50–55 D; 65–70 D
Tensile strength, p.s.i. 4000–5000; 5000–6000; 3500–4500
Tear strength, p.l.i., 300–400; 600–700; 500–650

A well-designed lawn mower blade should have a maximum of elongation, in order to reduce stress, minimize abrasion, reduce flutter, and prevent the blade from striking the housing. The material described above has a very low elongation; for example, a lawn mower blade 19 in. long has been found to elongate only ¾ in. during operation at 3600 r.p.m., thus providing an elongation of less than five percent. This material also has excellent elastic memory, so that the blade will return to its initial length after conclusion of the operation. The blade manufactured of this material will thus have sufficient structural integrity to provide satisfactory grass cutting, and yet will have sufficient flexibility to yield when striking extraneous objects such as a shoe, a rock, or a post. It is capable of gliding over the object and will have a certain amount of cushioning effect so that neither the object nor the blade will be damaged. While this is accomplished without the use of any reinforcing materials whatsoever so that the blade is homogeneous, it is also possible to add reinforcing materials such as fabric or cords, if extra stiffness is desired.

Other variations in the above form of the invention are within the scope of the invention, particularly since the variation in thickness or width of the blade or shape of the curves will affect the flexibility and cutting properties of the blade. In addition, the blade may be formed of multiple layers which are permanently joined rather than a single homogeneous layer of material. It is also possible to form a blade of three, four or more arms instead of the two arms which are shown and still fall within the scope of the invention.

We claim:
1. In a lawn mower having a rotatable shaft, a cutting blade mounted on said shaft composed entirely of a flexible urethane elastomer material, said blade having a central mounting portion and a plurality of outwardly extending arms having cutting surfaces, said arms being curved in a plane at right angles to said shaft.

2. The blade of claim 1 in which said arms are curved oppositely from each other.

3. The blade of claim 1 in which each of said arms is curved upwardly from its cutting surface with respect to the central plane of the blade.

4. In a lawn mower having a rotatable shaft, a cutting blade mounted on said shaft composed entirely of non-reinforced elastomeric urethane, said blade having a central mounting portion and a plurality of outwardly extending arms having cutting surfaces, said arms being oppositely curved in a plane at right angles to said shaft and being upwardly curved from their cutting surfaces with respect to the central plane of the blade.

References Cited
UNITED STATES PATENTS

| | | | |
|---|---|---|---|
| 2,506,054 | 5/1950 | Agee et al. | 56—26 |
| 2,517,405 | 7/1950 | Moss | 56—295 |
| 2,666,287 | 1/1954 | Atteberry | 56—295 |
| 3,104,510 | 9/1963 | Voigt | 56—295 |
| 3,156,082 | 11/1964 | Joyner | 56—295 |
| 3,176,455 | 4/1965 | Buchanan | 56—295 |

ABRAHAM G. STONE, *Primary Examiner.*

ANTONIO F. GUIDA, *Examiner.*